United States Patent
Crowley et al.

(10) Patent No.: US 11,767,048 B1
(45) Date of Patent: Sep. 26, 2023

(54) SUPPORT STRUT

(71) Applicants: Roger Crowley, Tualatin, OR (US);
Aaron Crowley, Canby, OR (US);
Stephen Swayze, Mulino, OR (US)

(72) Inventors: Roger Crowley, Tualatin, OR (US);
Aaron Crowley, Canby, OR (US);
Stephen Swayze, Mulino, OR (US)

( * ) Notice: Subject to any disclaimer, the term of this patent is extended or adjusted under 35 U.S.C. 154(b) by 0 days.

(21) Appl. No.: 18/301,364

(22) Filed: Apr. 17, 2023

Related U.S. Application Data

(60) Provisional application No. 63/363,239, filed on Apr. 19, 2022.

(51) Int. Cl.
*B62B 3/04* (2006.01)
*B62B 3/10* (2006.01)

(52) U.S. Cl.
CPC ............... *B62B 3/04* (2013.01); *B62B 3/108* (2013.01); *B62B 2203/30* (2013.01); *B62B 2203/74* (2013.01)

(58) Field of Classification Search
CPC ....... B62B 3/04; B62B 3/108; B62B 2203/30; B62B 2203/74; B62B 2203/70; B62B 2203/72; B62B 2206/04; B62B 5/0003; B60P 3/1033; B65G 7/04; B65G 39/025
See application file for complete search history.

(56) References Cited

U.S. PATENT DOCUMENTS

| | | | | |
|---|---|---|---|---|
| 3,444,973 A * | 5/1969 | Nygren | ................ | B65G 39/025 193/35 MD |
| 4,611,948 A * | 9/1986 | Johnson | .................. | F16B 7/048 403/187 |
| 4,689,847 A * | 9/1987 | Huber | .................. | B65G 39/025 16/24 |
| 5,464,086 A * | 11/1995 | Coelln | ................ | B65G 39/025 193/35 MD |
| 5,673,780 A * | 10/1997 | Bildsoe | .................. | B65G 13/11 108/55.3 |
| 8,118,293 B1 * | 2/2012 | Barger | ...................... | F41A 9/87 144/287 |
| 8,657,553 B1 * | 2/2014 | Rasmussen | .............. | B65G 7/04 414/535 |

(Continued)

FOREIGN PATENT DOCUMENTS

| | | | | |
|---|---|---|---|---|
| CA | 2917406 A1 * | 7/2016 | ............... | B62B 3/04 |
| CN | 105936400 A * | 9/2016 | | |

(Continued)

*Primary Examiner* — James A Shriver, II
*Assistant Examiner* — Ian Bryce Shelton

(57) ABSTRACT

A support strut assembly comprises a block with a first surface comprising a ball transfer, a second surface opposite the first surface, a first wall extending from a first edge of the second surface, and a second wall parallel to the first wall and spaced apart by a gap. A magnet is affixed to the first wall, and a second friction reducing component such as a wheel or a ball bearing mounted upon a shaft is deposited within the gap. Other friction reducing components may include a rotatable sphere, a fixed shaft, a rotatable shaft, a wheel, a bearing, or a glide strip. At least one of the two walls may further comprise a cavity facing into the gap. The shaft is preferably embedded within the block and a cavity exposed a grooved portion of the shaft to allow a snap ring to lock the shaft within the block.

23 Claims, 4 Drawing Sheets

(56) References Cited

U.S. PATENT DOCUMENTS

| | | | | |
|---|---|---|---|---|
| 10,518,975 | B2* | 12/2019 | Itoh | B65G 43/08 |
| 11,008,175 | B1* | 5/2021 | Watts | F16M 13/02 |
| 2004/0216982 | A1* | 11/2004 | Huber | B64C 1/20 |
| | | | | 193/35 MD |
| 2005/0126879 | A1* | 6/2005 | Olson | B65G 39/025 |
| | | | | 193/35 MD |
| 2006/0066065 | A1* | 3/2006 | Mason | A47F 3/0482 |
| | | | | 280/79.3 |
| 2012/0006237 | A1* | 1/2012 | Iguchi | F16C 29/046 |
| | | | | 384/15 |
| 2012/0068035 | A1* | 3/2012 | Iguchi | B65G 49/064 |
| | | | | 384/49 |
| 2014/0116841 | A1* | 5/2014 | Wilkins | B65G 39/025 |
| | | | | 198/369.1 |
| 2014/0367938 | A1* | 12/2014 | McBride | B62B 5/0093 |
| | | | | 280/79.11 |
| 2015/0108730 | A1* | 4/2015 | McBride | B62B 5/0086 |
| | | | | 280/79.11 |
| 2016/0229638 | A1* | 8/2016 | Wilkins | B65G 13/065 |
| 2017/0029003 | A1* | 2/2017 | Crowley | B62B 3/0612 |
| 2017/0121124 | A1* | 5/2017 | Wilkins | B65G 47/53 |
| 2017/0282778 | A1* | 10/2017 | Young, Jr. | B62B 3/102 |
| 2018/0050862 | A1* | 2/2018 | Wu | B65G 39/025 |
| 2019/0256306 | A1* | 8/2019 | Tackett | B65G 67/28 |
| 2019/0263435 | A1* | 8/2019 | Choueifati | B62B 5/049 |
| 2021/0009023 | A1* | 1/2021 | Hoeper | B60P 7/0892 |
| 2022/0212765 | A1* | 7/2022 | Sweeney | B62B 3/08 |

FOREIGN PATENT DOCUMENTS

| | | | | |
|---|---|---|---|---|
| CN | 108340944 A | * | 7/2018 | |
| CN | 211392618 U | * | 9/2020 | B65G 7/04 |
| CN | 112811066 A | * | 5/2021 | B60B 33/0042 |
| FR | 2558118 A1 | * | 7/1985 | |
| KR | 20140006129 U | * | 12/2014 | |
| KR | 20170015653 A | * | 2/2017 | |
| WO | WO-0101004 A1 | * | 1/2001 | B60B 33/08 |

* cited by examiner

A-A

SUPPORT STRUT

CROSS REFERENCE TO RELATED APPLICATION

This US non-provisional utility patent application claims the benefit of and priority to U.S. provisional application 63/363,239 "Support Strut," filed 19 Apr. 2022. The entire contents of U.S. provisional application 63/363,239 "Support Strut," filed 19 Apr. 2022 are hereby incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates to temporary, removable and replaceable struts for material transport systems.

BACKGROUND

Material transport and conveying systems use arrays of rollers or transfer balls to establish a material transport or support plane having low friction. Objects supported at the plane may be easily moved in one or more directions and may also be rotated easily while resting on the support plane. While conveyer rollers and arrays of transfer balls assist the motion of objects having flat planar undersides such as boxes, crates, and ingots or slabs of materials, other objects may have down-wardly protruding portions which may catch on the frame members which support the balls or rollers.

Configuring the support array to accommodate these particular objects entails industrial design and customized products and their associated additional costs. If in the mix of conveyed objects these particular types are frequent, then the additional expenses may be justified. However, if these objects are uncommon, they represent inconvenient exceptions to the work flow and an opportunity exists to provide temporary-use tools used for these exceptional tasks.

BRIEF SUMMARY

This invention relates to temporary or ad-hoc use tools used in conjunction with conveying or transport systems having one or more arrays of rollers or transfer balls, where within a mix of material objects being handled, occasional objects include downward projecting portions. A primary objective of the invention is to provide detachable and attachable struts which establish an elevated material handling plane in the vicinity of the object.

Rather than retrofitting an entire conveying system, another objective of the invention is to provide that a small number of such struts may be sequentially removed after the object has passed and installed ahead of its path.

A corollary objective is to provide a detachable strut having a friction reducing affordance on is upper aspect, and another corollary objective of the invention is that the strut may be easily affixable and detachable without needing to use any sort of tools.

BRIEF DESCRIPTION OF THE DRAWINGS

A further understanding of the nature and advantages of particular embodiments may be realized by reference to the remaining portions of the specification and the drawings. Similar reference numerals are used to refer to similar components.

FIG. 4b shows a bottom left front view of the support strut of FIG. 4a.

FIG. 5 shows an exploded view of components of the support strut of FIG. 4a.

DETAILED DESCRIPTION OF CERTAIN EMBODIMENTS

Figure 1:
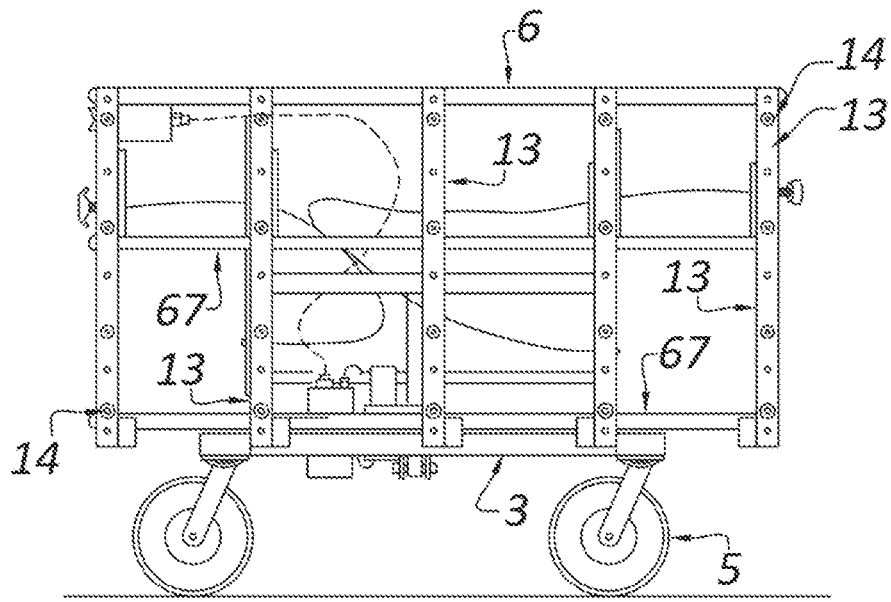
FIG. 1 shows a material handling cart having a slab support frame with an array of ball transfers.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In this specification and in the claims, unless an exact quantity of one is explicitly stated, the indefinite articles "a" and "an" shall be understood to encompass both a singular entity and any one entity identifiable within a plurality of such entities, so that for example a shaft recited to have "a snap ring groove" and "a snap ring received within said snap ring groove" will encompass a shaft having one or more than one snap ring groove, and one or more snap rings received within any one or more of the snap ring grooves. Also in this specification, the term "means for . . . " as used herein including the claims, is to be interpreted according to 35 USC 112 paragraph 6.

The invention is a support strut assembly that comprises a block with a first surface comprising a ball transfer, a second surface opposite the first surface, a first wall extending from a first edge of the second surface, and a second wall parallel to the first wall and spaced apart by a first gap. A magnet is affixed to the first wall, and a second friction reducing component such as a wheel or a ball bearing mounted upon a shaft is deposited within this first gap. Other friction reducing components may include a rotatable sphere, a fixed shaft, a rotatable shaft, a wheel, a ball bearing, or a glide strip. At least one of the two walls may further comprise a cavity facing into the gap. The shaft is preferably embedded within the block and a cavity exposes a grooved portion of the shaft to allow a snap ring to lock the shaft within the block. Other embodiments within the scope of the invention do not have a magnet, but at least one magnet is typically present in the preferable embodiments described herein.

In this specification a "ball transfer" is a device housing a rotatable sphere for presenting its zenith to support passing objects in motion, usually for material handling and conveying. In more typical application a large number of ball transfers are arranged in extensive arrays with their zeniths in a common plane or a manifold surface, so that crates, boxes and packages may coast along the plane or a conveyor surface with substantially reduced friction. They are particularly convenient in package sorting work areas.

In an innovative application shown in FIG. 1 and invented by a subset of the present inventorship, a material handling cart has a pivotable slab support frame [6] with an array of ball transfers [14.] The slab support frame is in turn supported by a wheeled [5] lower frame [3.] Some of the frame members [67] of the pivotable frame include friction reducing glide strips [13] interspersed between the ball transfers of the frame.

Figure 2A:
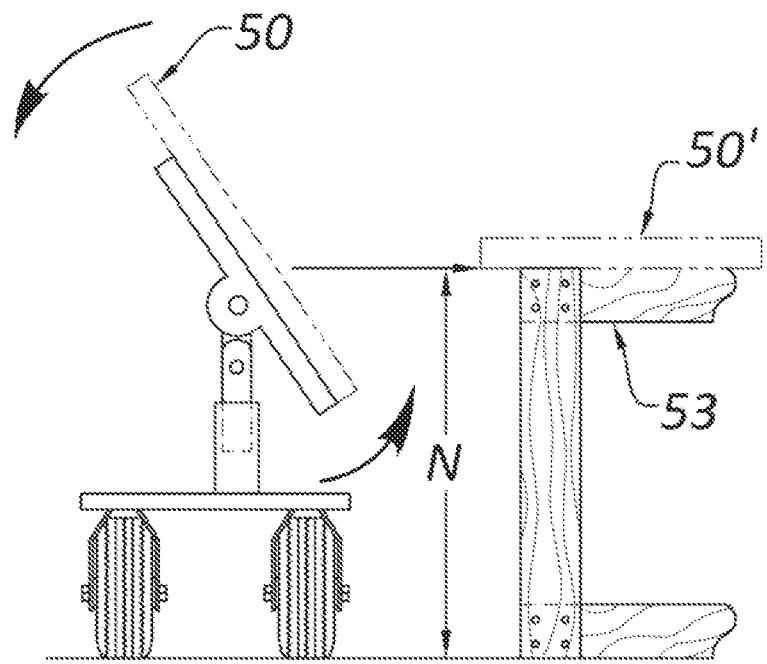
FIG. 2a shows the cart of FIG. 1 in use for positioning a countertop slab on prepared cabinetwork.

FIG. 2a shows the cart of FIG. 1 in use for positioning a countertop slab [50] on prepared cabinetwork. This invention is effective for transporting slab materials like granite countertops to an install side and the ball transfers facilitate sliding a countertop slab onto new construction cabinetwork [53] having a particular install height [N.] The reduced friction of the countertop slab sliding on the ball transfers and glide strips substantially reduces the force and work involved in positioning a countertop at a desired installed location [50'.]

However, some countertop slabs come with or are fitted with a reinforcing flange [68,] a dropped edge, or a laminated edge projecting downward below the effective friction reduced transfer plane defined by the transfer balls. A dropped edge is shown in this figure as a shaded portion of the left end of the slab. In this application, lifting the countertop off the pivotable frame for the underside flange to clear the ball transfers prevents them from being able to contribute low-friction support to the slab and substantially defeats this benefit provided by the invention. Workers must now lift a slab in concert and take care in not allowing the slab to bend or twist, because some materials such as granite countertops are very fragile in tensile strength and shear strength. A breakage would have to be borne by the countertop install company as an inventory loss. Supporting and manipulating large countertops by human muscle force alone also opens members of the work crew to injurious accidents, which besides the human loss, cost the company and customer in lost time, and expensive workmens' compensation claims.

Figure 2B:
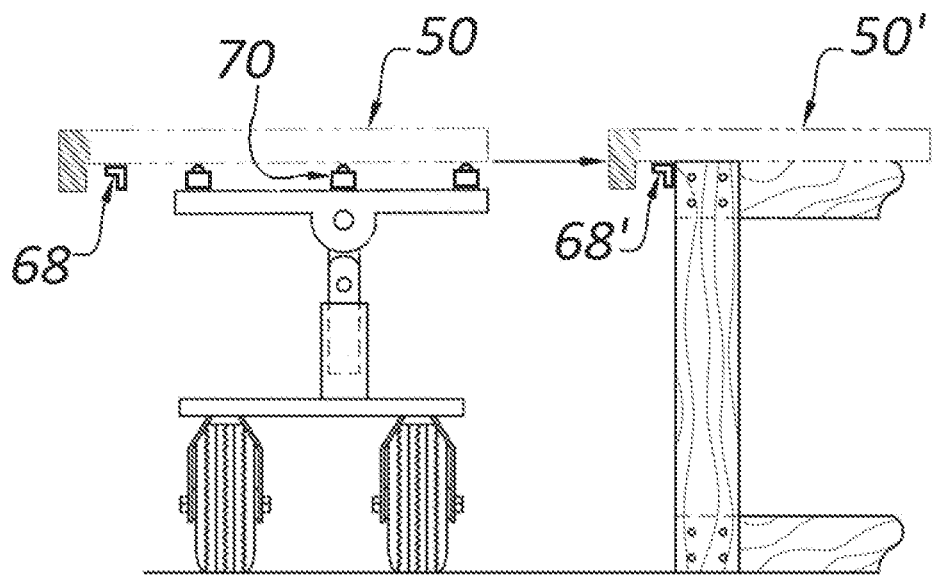
FIG. 2b shows the cart of FIG. 1 positioning a counter-top slab having an underside reinforcing flange, and with support struts in accordance with the invention elevating the flange so that it clears the slab support frame of the cart.

FIG. 2b shows the cart of FIG. 1 positioning a countertop slab [50] having an underside reinforcing flange (or the dropped edge as shown, or a laminated edge) but with support struts [70] in accordance with the invention elevating these downward projecting features so that they clear the slab support frame of the cart. With these additional devices, the cart is able to provide its originally inventive benefits of reducing the forces required to manipulate a slab into an installed position [50',] substantially improved jobsite safety, and reduction of material waste due to breakages. While being moved into position, the downwardly projecting elements such as the reinforcing flange or dropped edge are elevated by instances of the invention and bypass over the top of the frame to the installed position [68'.]

Figure 3A:
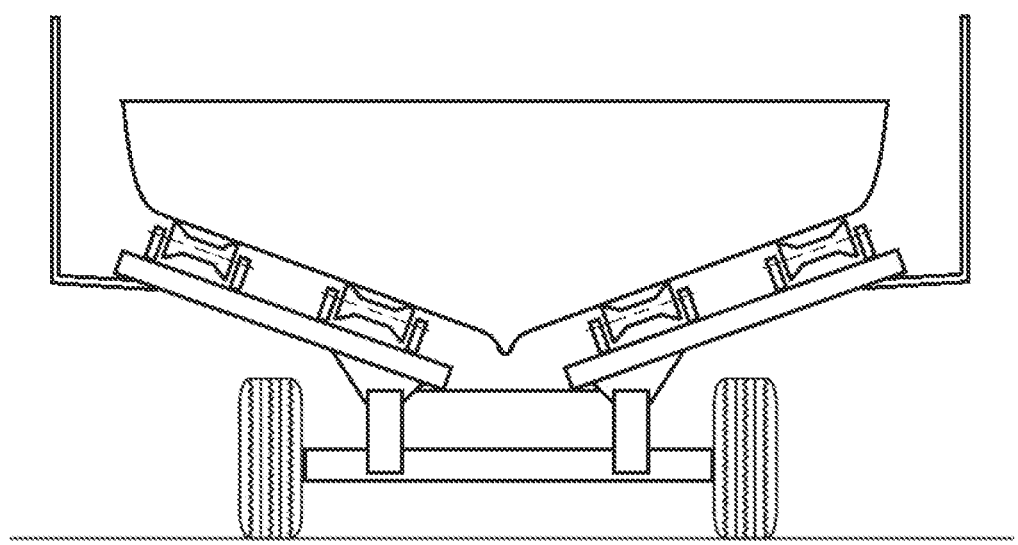
FIG. 3a shows a stylized view of a conventional boat trailer supporting a typical boat having a modest draft.

FIG. 3a shows a stylized view of a conventional boat trailer supporting a typical boat having a modest draft. The trailer includes rollers so that certain underside features of the hull such as strakes and the keel do not contact the trailer frame members. Just as with the countertop cart invention, heavy objects must be supported against the force of gravity while being manipulated in directions mostly transverse to the direction of gravity. In this case, sliding contact of the keel or other parts of the hull with the trailer frame members risks damage to the hull, and rollers or glide strips on trailers are provided to reduce the transverse force required to load the boat onto the trailer.

Figure 3B:
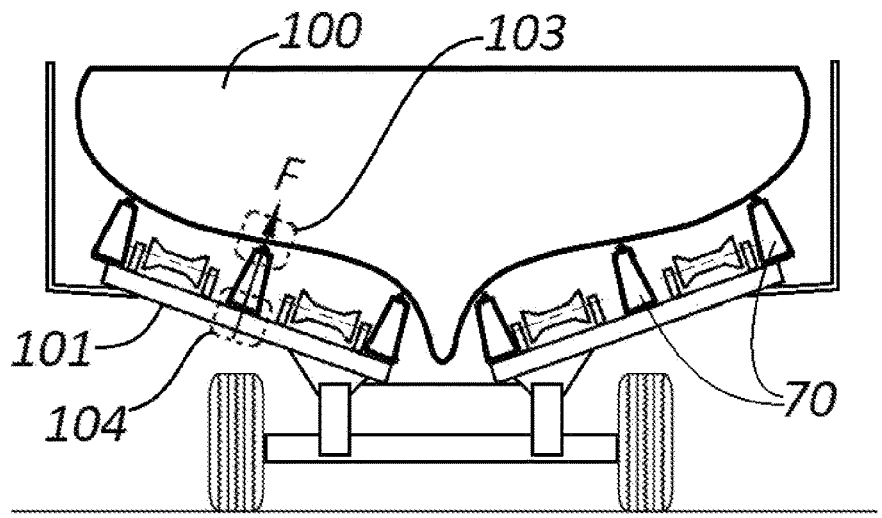
FIG. 3b shows a stylized view of the boat trailer of FIG. 3a supporting a boat having a deeper keel, and with support struts in accordance with the invention elevating the boat so its keel keeps clear of the trailer frame.

FIG. 3b shows a stylized view of the boat trailer of FIG. 3a supporting a boat [100] having a deeper keel, and with support struts [70] in accordance with the invention elevating the boat so its keel keeps clear of the trailer frame members [101.] To accomplish this, the invention acts as a force transfer structure having two support structures, one in contact with the load being supported the boat, and the other in contact or registered with the trailer frame member beneath it. This sort of need may arise when a boater buys a first boat and then selects a trailer sized and configured to transport the first boat. Then later, the boater exchanges the first boat for a second boat but the underside contours of the new boat do not comport with the friction reducing devices (rollers, or glide strips) that originally came with the trailer. So as not to have to exchange the existing trailer for a different one, support struts of the invention may be installed on the frame to provide additional elevation to clear the downwardly-protruding features of the new boat.

The situation is similar to the granite countertops. The rolling cart and tiltable frame device was originally designed for countertops having a planar underside surface. But with newer styles of countertops now including dropped edges and underside reinforcing beams, these types of countertops require an elevated plane where friction reducing components assist transverse motion of the slab off the cart frame and onto the table.

Thus, the invention provides a first support structure [103] comprising a first friction reducing component for reducing friction for motion of a supported object [100] transverse to a support force [F] in a first direction, which in most applications means support of an object against the direction of its weight (i.e, vertical or near vertical) while allowing the object to be easily moved in directions lateral to gravity. The first support structure contacts the load being moved, and the first friction reducing component is a ball transfer installed in the first frame. The load or object being supported contacts the multi-axially rotatable ball.

A second support structure [104] is registerable with a supporting object [101] such as the frame channels of the pivotable cart or the frame members of the boat trailer in the other example. The invention enables a user to install one or more of the support struts onto a frame and adjust their location by sliding them along the frame members until a best support effect is achieved.

Many frames for transporting objects are fabricated out of rectangular beams or rectangular metal tubing. Embodiments in accordance with the invention include features designed to help register the second support structure of a strut to a rectangular supporting member. These features include a first wall extending from a first edge and a second wall parallel to the first wall and spaced apart by a first gap. This first gap fits over the supporting structural member and the first and second walls extend below and bestride the supporting structural member. In other embodiments within the scope of the invention, the first gap is of a flexible width and the first and second walls, or friction reducing faces or elements of these walls may be spring-biased toward each other so that a support object is embraced or bestrode on opposed surfaces by the walls.

In preferred embodiments of the force transfer structure adapted for use with steel frames as supporting structural members beneath the support strut, a magnet is affixed to the first wall, and preferably a second friction reducing component is deposited within the first gap for reducing friction for motion of the force transfer structure transverse to a support force received in the first direction from a supporting object. This second friction reducing component allows the force transfer structure (aka support strut) to be easily re-positioned along a beam or rectangular tube. In some preferable embodiments the second friction reducing component comprises a fixed shaft and a roller rotatably coupled to the fixed shaft.

Figure 4A:
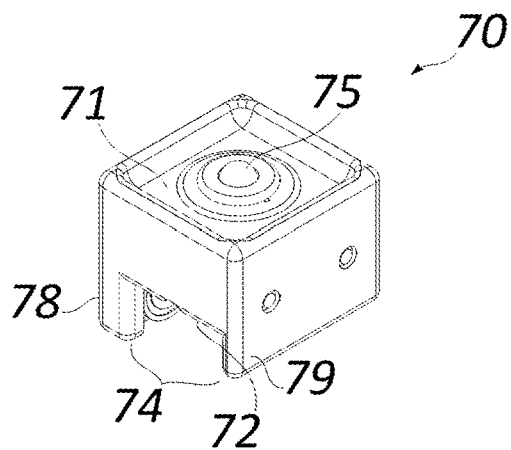
FIG. 4a shows a top left front view of an embodiment of a support strut in accordance with the invention.

FIG. 4a shows a top left front view of an embodiment of a support strut [70] in accordance with the invention. Rather than being built as an open frame with two support structure areas, embodiments within the scope of the invention may alternatively include a strut component fashioned out of a block or manufactured by injection molding. Such a support strut assembly comprises a block or frame with a first surface [71] comprising a first friction reducing component [75.] With a ball transfer the first friction reducing component comprises a multi-axially rotatable sphere. Other friction reducing components may be a rotatable wheel, or a glide strip, or a glide surface such as a button of material made of a lubricious material such as high-density polyethylene or oil impregnated bronze.

The support strut assembly also comprises a second surface [72] opposite from the first surface. A first wall [78] extends from a first edge of the second surface and a second wall [79] parallel to the first wall and spaced apart by a first gap [74] extends from a second edge preferably parallel to the first edge. When used with frames, beams, or truss members of a support structure, the first gap may be sized to accommodate a width of the typical structural member, such as the frame or steel tubing of a boat trailer or other sorts of transport frames.

Figure 4B:
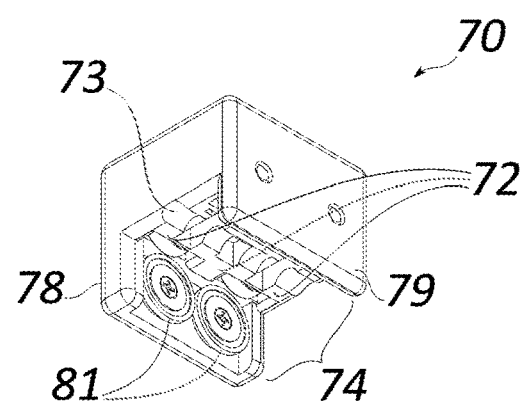

FIG. 4b shows a bottom left front view of the support strut [70] of FIG. 4a. The support strut assembly comprises a second surface [72] opposite the first surface, which in this example is interrupted by several cavities. A first wall [78] extends from a first edge of the second surface and a second wall [79] preferably parallel to the first edge. The first and second walls are spaced apart by a first gap [74.] In the type of embodiment shown, the second surface is also interrupted by a groove [73] parallel to the first wall.

The first wall includes at least one magnet [81] which may attract the wall and the rest of the device to support objects that are ferrous materials or otherwise attractable by magnets. The attractive force allows the block to be set and remain at rest even on supporting objects that have inclined surfaces or are other than horizontal, and they are easily moved about on steel frame supporting objects to optimally engage the first friction reducing component with the object being served by the invention.

Figure 4C:
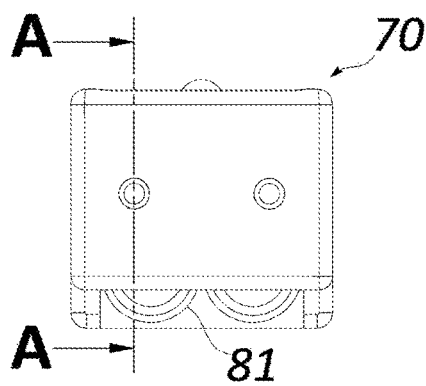
FIG. 4c shows a front view of the support strut of FIG. 4a and defines section line A-A for the cross section view of FIG. 4d.
Figure 4D:
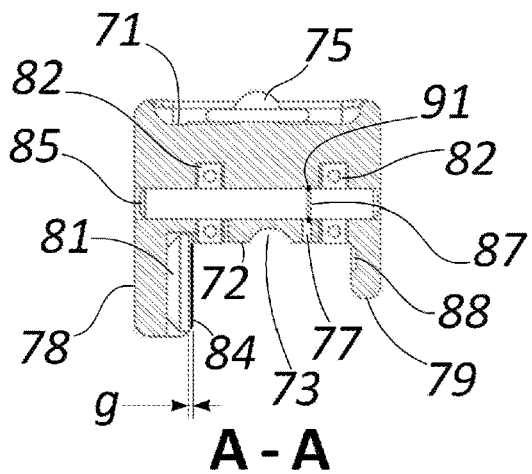
FIG. 4d shows a cross section view of the support strut of FIG. 4a taken at section line A-A seen in FIG. 4c.

WM FIG. 4c shows a front view of the support strut [70] of FIG. 4a and defines section line A-A for the cross section view of FIG. 4d. The magnets [81] of the first wall extending from the second surface of the strut are seen in this view.

FIG. 4d shows a cross section view of the support strut of FIG. 4a taken at section line A-A seen in FIG. 4c. The support strut is an assembly comprising a block or frame with a first surface [71] comprising a first friction reducing component [75] and a second surface [72] opposite the first surface. A first wall [78] extends from a first edge of the second surface and a second wall [79] parallel to the first wall extends from a second edge of the second surface opposite the first edge and spaced apart by a first gap. A magnet [81] is affixed to the first wall and oriented so that its attractive field may act upon ferrous or magnetically attractable objects within the gap.

A second friction reducing component is also deposited within the first gap. In the type of embodiment shown, the second friction reducing component is a subassembly comprising a shaft and at least one bearing [82] associated with the shaft. Friction reduction when in contact with a supporting object may be accomplished by first: the outer race of the bearing may be press fit into the block and the shaft fitted to the inner race of the bearing for coupled rotation within the outer race, or second: the shaft may be press fit into the block and non-rotatable, with the inner race of the bearing press fit onto the shaft and thus fixed from rotation, and the outer race of the bearing freely rotatable.

In the first type of embodiment the block may roll upon the supporting object in the first gap by having the rotatable surface of the shaft in contact with the supporting object. In the second type of embodiment, the block may roll upon the supporting object in the first gap by having the external, rotatable surface of the outer race in contact with the supporting object.

In preferable embodiments including such a shaft [85,] the shaft is at least partially embedded within the block, and to prevent axial excursion over time, the shaft may also have a snap ring groove [87] for a snap ring [91] installed therein. The second friction reducing component may comprises a component selected from the set of components consisting of: a rotatable sphere, a fixed shaft, a rotatable shaft, a wheel, a bearing, a roller, and a glide strip. In this specification, "a bearing" may be a ball bearing, a needle bearing, or a journal bearing. The second surface and the inner-facing surfaces of the walls may also include one or more friction reducing strips or surfaces, such as strips made of a lubricious material such as high-density polyethylene or oil impregnated bronze.

In the type of embodiment shown, at least one wall from among the first and second walls further comprises a cavity facing the first gap. The magnets may be recessed within the cavity so that other portions of the wall shroud and protect the magnets from impact with the supporting object. Impacts are known to reduce the attractive force in magnets and magnetized objects. Also in the type of embodiment shown, the second surface is also interrupted by a groove [73] parallel to the first wall.

In another preferable embodiment, at least one face of the first wall that faces the first gap is a friction reducing face [84.] Friction reduction schemes for this face include polishing the face, hardening the face, or applying treatments or coatings such as by anodizing (sometimes called "hard anodizing.") In an exemplary embodiment, the block or frame may be fashioned out of aluminum, and these friction reducing faces may be hard coated to a surface hardness, a micro-hardness, or a nano-hardness achieving Rockwell 70C or harder, or a Vickers hardness of 400 or more. In other exemplary embodiments, case-hardening of alloy steel may establish the friction reducing face, and in yet other embodiments, strips of friction reducing materials such as a low-density or a high-density polyethylene or a polyimide film such as Kapton® may be affixed to a first wall face that faces toward the first gap. A friction reducing face may also be fitted with one or more rollers, ball transfers, or hardened pins or détente pins.

The magnets that reside within the cavity of the first wall are recessed within the cavity behind the friction reducing face by a second gap [g.] The friction reducing face then acts as a glide surface that maintains the second gap between the magnets and the support object received within the first gap. The second gap preferably maintains an optimal distance for maximal inverse-square attractive magnetic force, but without allowing the magnet to touch the surface of the support object, and also protects the magnet from impact with the support object because impacts to a magnet deteriorate its attractive force.

Figure 5:
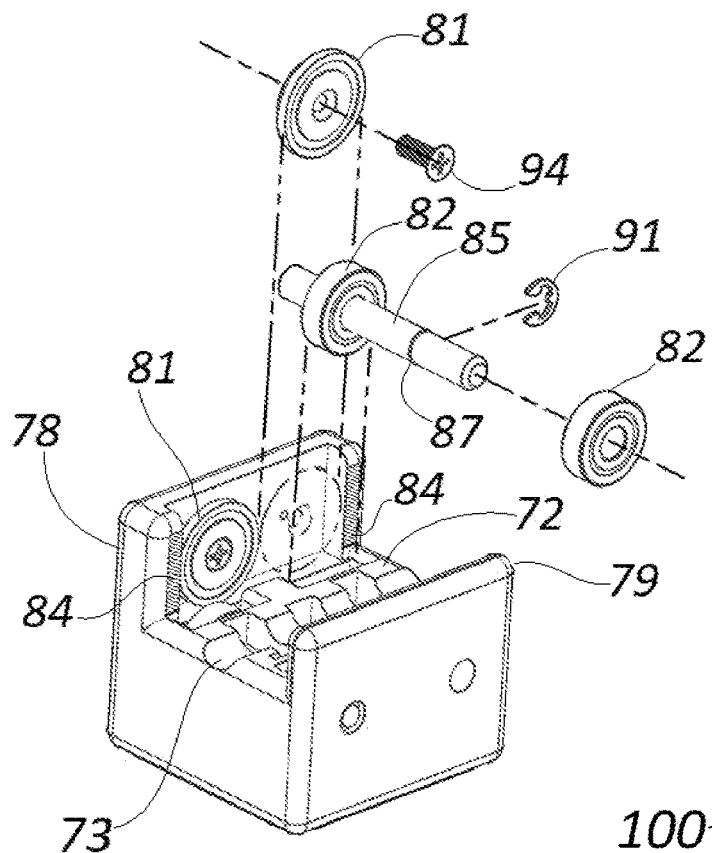

FIG. 5 shows an exploded view of components of the support strut of FIG. 4a. The support strut is oriented to show the underside or second surface [72] with the first wall [78] and second wall [79] extending beyond the second surface. The second surface is also interrupted by a groove [73] parallel to the first wall. The first wall includes a recessed area or pocket wherein the magnets [81] are disposed. One of the magnets is shown exploded to illustrate that it is secured to the first wall by a threaded fastener [94.]

At least one shaft transverse to the walls is pressed into the block component of the device. For easier disassembly and maintenance, in an alterative embodiment the shaft [85] may reside loose in its transverse aperture but restrained from axial travel by a snap ring [91] received within a snap ring groove [87] in the shaft.

The block further comprises at least one cavity ([77] in FIG. 4d) in the second surface exposing a portion of the shaft. For tool access, the shaft further comprises a snap ring groove exposed by the cavity. During assembly, the snap ring is received within the cavity and installed in the snap ring groove. One of the several pockets in the block exposes the installed snap ring for access by a snap ring removal tool. The loose shaft may be slid out of its transverse aperture after the snap ring is removed.

Other pockets are arranged in the block for one or more free-spinning bearings [82] which are loosely fitted upon or pressed onto the shaft. For bearings which ride loosely on the shaft such that the inner race of a bearing may rotate with respect to the shaft, the pocket for receiving the bearing may be axially proximate to the bearing so as to constrain the axial travel of the bearing so that it remains in its pocket. In this embodiment the shafts act as fixed or rotatable axles and the bearings act as wheels rotatable about the axes of the shafts. The supporting object for the strut contacts the rotatable outer races of the bearings as friction reducing components which reduce rolling and sliding friction to allow the strut to stick to a metal frame or beam by magnetic force while being easily adjustable to various locations along the frame or beam.

In embodiments which include one or more friction reducing faces [84,] at least one face of the first wall faces the first gap. In the example shown in this figure, two glide surfaces are friction reducing faces and are made narrow so as to minimize friction when the block is slid along a lenticular supporting object. When the block or frame is made by injection molding, a friction reducing surface may include an insert molded element made of a lubricious material. Preferred materials for injection molding a block or frame in accordance with the invention include nylon (polyamide,) 4,6-nylon, 6,6-nylon, Delrin®, acetal, polyoxymethylene, acrylonitrile butadiene styrene (ABS,) and fiber-filled composites of these plastics and similar plastics such as these.

Figure 6:
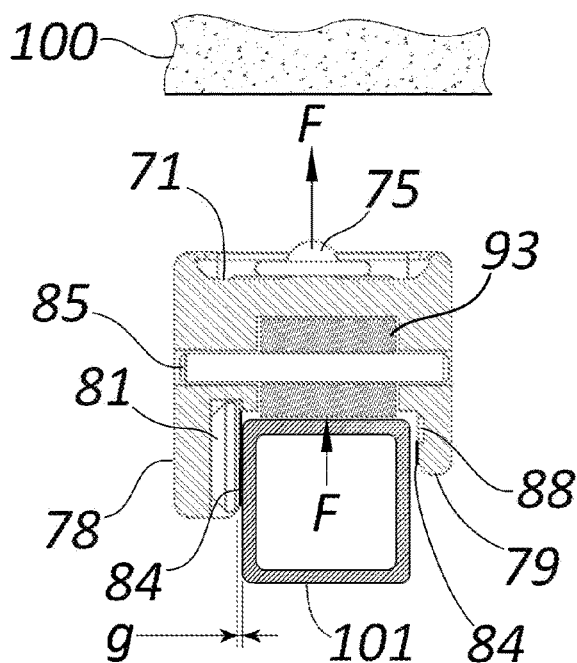
FIG. 6 shows a cross section of an alternative embodiment of a support strut in accordance with the invention taken at section line A-A seen in FIG. 4c.

FIG. 6 shows a cross section of an alternative embodiment of a support strut in accordance with the invention taken at section line A-A seen in FIG. 4c. The block and its components are a force transfer structure comprising a first support structure [71] with a first friction reducing component [75] for reducing friction for motion of a supported object [100] transverse to a support force [F] in a first direction. In this type of embodiment the supported object as illustrated may move left and right or into and out of the page as directions of motion transverse to the support force applied to the underside of the supported object by a ball transfer in this case. The supported object is shown elevated from the invention, but in practice its underside would be in contact with the friction reducing component.

The strut includes a second support structure registerable with a supporting object [100] and the second support structure further comprises a first wall [78] extending from a first edge of the second support structure and a second wall [79] parallel to the first wall and spaced apart by a first gap. In this example the supporting object is a portion of steel tubing such as part of a trailer frame. A magnet [81] is affixed to the first wall or may reside within a cavity in the first wall as shown in this figure. A second friction reducing component is deposited within the first gap for reducing friction for motion of the force transfer structure transverse to a support force received in the first direction from a supporting object.

In this type of embodiment shown, the second friction reducing component comprises a fixed shaft [85] and a roller [93] rotatably coupled to the fixed shaft. In an alternative embodiment the roller is press fit to the shaft for coupled rotation with it and the shaft resides loosely and rotates within its transverse aperture in the block. The rotatable shaft has the roller affixed to it. Either the loose fit of the roller on the shaft or the loose fit of the shaft within its transverse aperture, or both, act as a journal bearing for reducing friction and so either or both of these components may be called a second friction reducing component.

The first wall includes a friction reducing face [84] facing towards the first gap. Magnets that reside within the cavity of the first wall are recessed within the cavity behind the friction reducing face by a second gap [g] so the support object is allowed to approach closely to while remaining spaced apart from the magnets. Optionally, a second set of one or more friction reducing faces may be presented towards the support object from the second wall as well. The second wall may include a second cavity [88] for holding additional magnets or for minimizing the contact area of its friction reducing faces.

In an alternative embodiment within the scope of the invention, rather than machining features out of a block, larger versions of the invention may be fabricated using a truss or frame structure in which the first support structure [71] is a fabrication of structural members, some of which retain the friction reducing component [75] which may be one or an array of ball transfers, or rollers, or lubricious material faces, or combinations of these. The second support structure is spaced apart from the first, and comprises a second structural fabrication from which the first and second walls append. Furthermore, rather than being solid, the walls themselves may comprise frame elements for mounting and orienting the magnets and establishing the gap between them.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. A support strut assembly comprising:
   a block with
      a first surface comprising a first friction reducing component and a second surface opposite said first surface,
      a first wall extending from a first edge of said second surface and
      a second wall parallel to said first wall and spaced apart by a first gap extending from a second edge,
      with at least one wall from among said first and second walls further comprising a cavity facing said first gap,
   a magnet affixed to said first wall, and
   a second friction reducing component deposited within said first gap, with
   at least one wall from among said first and second walls further comprising a cavity facing said first gap,
   and wherein said first wall further comprises at least one friction reducing face facing said first gap, and said magnet resides within said cavity recessed from said friction reducing face by a second gap.

2. The support strut assembly of claim 1, wherein said first friction reducing component comprises a multi-axially rotatable sphere.

3. The support strut assembly of claim 1, wherein said second friction reducing component comprises a component selected from the set of components consisting of:
   a rotatable sphere, a fixed shaft, a rotatable shaft, a wheel, a bearing, a roller, and a glide strip.

4. The support strut assembly of claim 1, wherein said second wall further comprises at least one friction reducing face facing said first gap.

5. The support strut assembly of claim 1, further comprising at least one shaft at least partially embedded within said block.

6. The support strut assembly of claim 5, with said block further comprising a cavity in said second surface exposing a portion of said shaft.

7. The support strut assembly of claim 6, wherein said shaft further comprises at least one snap ring groove exposed by said cavity, and further comprising a snap ring received within said cavity and installed in any snap ring groove from among said at least one snap ring groove.

8. The support strut assembly of claim 1, wherein said second surface is interrupted by a groove.

9. A force transfer structure comprising
   a first support structure comprising a first friction reducing component for reducing friction for motion of a supported object transverse to a support force in a first direction,
   a second support structure registerable with said supporting object by further comprising
      a first wall extending from a first edge of said second support structure and
      a second wall parallel to said first wall and spaced apart by a first gap extending from a second edge, and
      a magnet affixed to said first wall, and
   a second friction reducing component deposited within said first gap for reducing friction for motion of said force transfer structure transverse to said support force received in said first direction from said supporting object, and further comprising a shaft having at least one snap ring groove, and further comprising a snap ring installed within any snap ring groove from among said at least one snap ring groove.

10. The force transfer structure of claim 9, wherein said first friction reducing component comprises a multi-axially rotatable sphere.

11. The force transfer structure of claim 9, wherein said second friction reducing component comprises a component selected from the set of components consisting of:
a rotatable sphere, a fixed shaft, a rotatable shaft, a wheel, a bearing, a roller, and a glide strip.

12. The force transfer structure of claim 9, wherein said second friction reducing component comprises a fixed shaft and a roller rotatably coupled to said fixed shaft.

13. The force transfer structure of claim 9, wherein said second friction reducing component comprises a rotatable shaft and a roller affixed to said rotatable shaft.

14. The force transfer structure of claim 9, wherein at least one wall from among said first and second walls further comprises a cavity facing said first gap.

15. The support strut assembly of claim 14, wherein said first wall further comprises at least one friction reducing face facing said first gap, and said magnet resides within said cavity recessed from said friction reducing face by a second gap.

16. The support strut assembly of claim 4, wherein said second wall further comprises at least one friction reducing face facing said first gap.

17. A support strut assembly comprising:
a block with
a first surface comprising a first friction reducing component and a second surface opposite said first surface,
a first wall extending from a first edge of said second surface and
a second wall parallel to said first wall and spaced apart by a first gap extending from a second edge,
at least one shaft at least partially embedded within said block, and
a cavity in said second surface exposing a portion of said shaft,
a magnet affixed to said first wall,
a second friction reducing component deposited within said first gap, and with said shaft further comprising at least one snap ring groove exposed by said cavity, and further comprising a snap ring received within said cavity and installed in any snap ring groove from among said at least one snap ring groove.

18. The support strut assembly of claim 17, wherein said first friction reducing component comprises a multi-axially rotatable sphere.

19. The support strut assembly of claim 17, wherein said second friction reducing component comprises a component selected from the set of components consisting of:
a rotatable sphere, a fixed shaft, a rotatable shaft, a wheel, a bearing, a roller, and a glide strip.

20. The support strut assembly of claim 17, wherein at least one wall from among said first and second walls further comprises a cavity facing said first gap.

21. The support strut assembly of claim 20, wherein said first wall further comprises at least one friction reducing face facing said first gap, and said magnet resides within said cavity recessed from said friction reducing face by a second gap.

22. The support strut assembly of claim 17, wherein said second wall further comprises at least one friction reducing face facing said first gap.

23. The support strut assembly of claim 1, wherein said second surface is interrupted by a groove.

\* \* \* \* \*